(12) United States Patent
De Cnodder et al.

(10) Patent No.: US 7,961,607 B2
(45) Date of Patent: Jun. 14, 2011

(54) MARKING DETERMINING DEVICE AND RELATED METHOD

(75) Inventors: Stefaan De Cnodder, Lille (BE); Omar Elloumi, Antwerp (BE); Kenny Julien Pauline Pauwels, Temse (BE)

(73) Assignee: Alcatel, Paris (FR)

( * ) Notice: Subject to any disclaimer, the term of this patent is extended or adjusted under 35 U.S.C. 154(b) by 2216 days.

(21) Appl. No.: 10/026,690

(22) Filed: Dec. 27, 2001

(65) Prior Publication Data
US 2002/0087715 A1    Jul. 4, 2002

(30) Foreign Application Priority Data
Dec. 28, 2000 (EP) ................................. 00403704

(51) Int. Cl.
*H04L 12/26* (2006.01)
(52) U.S. Cl. .................. 370/230; 370/235; 370/252
(58) Field of Classification Search .............. 370/235, 370/235.1, 252, 253, 395.43, 395
See application file for complete search history.

(56) References Cited

U.S. PATENT DOCUMENTS

| | | | | |
|---|---|---|---|---|
| 5,367,523 | A | * | 11/1994 | Chang et al. .............. 370/235 |
| 6,147,970 | A | * | 11/2000 | Troxel ...................... 370/235 |
| 6,748,435 | B1 | * | 6/2004 | Wang et al. ................ 709/225 |
| 6,839,321 | B1 | * | 1/2005 | Chiruvolu ................. 370/230.1 |

FOREIGN PATENT DOCUMENTS

| | | |
|---|---|---|
| WO | WO 00/56024 | 9/2000 |
| WO | WO 00/60817 | 10/2000 |

OTHER PUBLICATIONS

J. Heinanen et al.: "A Two Rate Three Colour Marker", Internet Engineering Task Force (IETF), University of Pennsylvania, Sep. 1999, pp. 1-5.

* cited by examiner

*Primary Examiner* — Jayanti K Patel
*Assistant Examiner* — Anthony Sol
(74) *Attorney, Agent, or Firm* — Sughrue Mion, PLLC

(57) ABSTRACT

The present invention relates to a marking determining method and a related device for determining a packet marking of packets of an incoming packet-flow, in order to keep the packets in conformance with a traffic policy. The determining is based on an actual value of a traffic reservation parameter, while the traffic reservation parameter is a measure of available network resources dedicated to packets of said incoming packet-flow having a pre-assigned priority. The determining further is based on the pre-assigned priority of the packets of the incoming packet flow. The marking method a first steps of holding a threshold value for the traffic reservation parameter, while the threshold value is lying between a minimum and a maximum value of the traffic reservation parameter. A second step is the metering the actual value of the traffic reservation parameter and a last step of determining the packet marking of the packets only based on the actual value of the traffic reservation parameter if the actual value of the traffic reservation parameter exceeds the threshold value for the traffic reservation parameter.

16 Claims, 1 Drawing Sheet

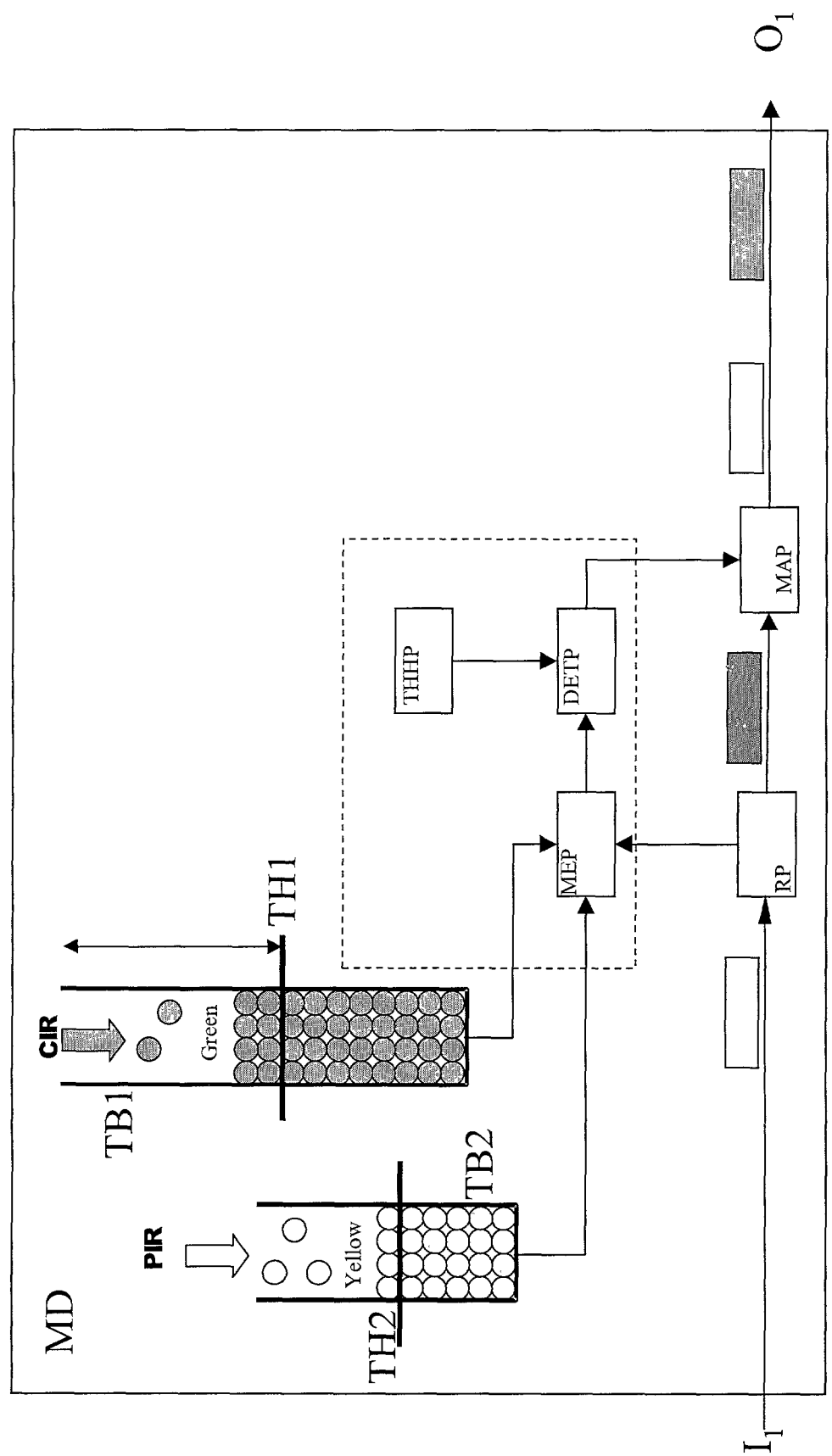

ably, called marking the packets either with a red, yellow or green colour. This metering is performed in one of two modes, either in a first mode which assumes that the packets of the IP stream do not have a pre-assigned loss probability, called the colour-blind mode or in a second mode assuming that each of the packets does have a pre-assigned packet loss probability called the colour aware mode.

MARKING DETERMINING DEVICE AND RELATED METHOD

BACKGROUND OF THE INVENTION

1. Field of the Invention

The present invention relates to a marking determining method and a related device.

2. Description of Related Art

Such a marking determining device is already known in the art, e.g. from the Internet Engineering Task Force (IETF) document "*A Two rate three colour marker*" with reference RFC 2698 from the authors J. Heinanen and R. Guerin, published in September 1999. Therein, a marking determining device is described, metering traffic reservation parameters of an incoming IP packet stream and subsequently marking its packets, based on two traffic reservation parameters, called the token count of the respective green and yellow token buckets, either with one of a pre-assigned packet loss probability, called marking the packets either with a red, yellow or green colour. This metering is performed in one of two modes, either in a first mode which assumes that the packets of the IP stream do not have a pre-assigned loss probability, called the colour-blind mode or in a second mode assuming that each of the packets does have a pre-assigned packet loss probability called the colour aware mode.

In case of this first mode of marking, the actual value of the traffic reservation parameters determines which packet loss priority the packet is assigned or marked.

In the colour aware mode the pre-assigned priority, i.e. that is the colour of the packet is taken into account and the predetermined rules and condition are such that the network resources dedicated to high priority packets, called green tokens, never are available for a medium priority packet called a yellow packet and the network resources dedicated to high and medium priority packets are not available for the low priority packets, called red packets. In this way the network resources are reserved for high priority packets in first instance and for medium priority packets in a second instance. In case there are no incoming high priority packets in the IP-packet stream, the network resources dedicated to these high priority packets is not used and gets consequently lost meaning that the reserved resources are not used.

BRIEF SUMMARY OF THE INVENTION

An object of the present invention is to provide a marking determining device and a related method of the above known type facilitating to perform the marking of packets in a more efficient way, such that the available network resources are used more efficiently in comparison to the marking device known in the art.

According to an exemplary embodiment of the present invention, this object is achieved by a marking determination method, for determining a packet marking of packets of an incoming packet-flow, in order to keep said packets in conformance with a traffic policy, said determining being based on an actual value of a traffic reservation parameter, said traffic reservation parameter being a measure of available network resources dedicated to packets of said incoming packet-flow having a pre-assigned priority, said determining further being based on said pre-assigned priority of said packets of said incoming packet flow, said traffic reservation parameter having a predetermined minimum and a maximum value, said marking method comprising: holding a threshold value for said traffic reservation parameter, said threshold value lying between said minimum and said maximum value of said traffic reservation parameter; metering said actual value of said traffic reservation parameter; and determining said packet marking of each of said packets based on said actual value of said traffic reservation parameter when said actual value of said traffic reservation parameter exceeds said threshold value for said traffic reservation parameter.

According to another exemplary embodiment of the present invention, this object is achieved by a marking determining device, for determining a packet marking of packets of an incoming packet-flow, in order to keep said packets in conformance with a traffic policy, said determining being based on an actual value of a traffic reservation parameter, said traffic reservation parameter being a measure of available network resources dedicated to packets of said incoming packet-flow having a pre-assigned priority, said determining further being based on said pre-assigned priority of said packets of said incoming packet flow, said traffic reservation parameter having a predetermined minimum and a maximum value, said marking device comprising: a. threshold holding part (THHP), adapted to hold a threshold value for said traffic reservation parameter, said threshold value lying between said minimum and said maximum value of said traffic reservation parameter; b. metering part (MEP), adapted to check on said actual value of said traffic reservation parameter; and c. determination part (DETP), adapted to determine said packet marking of each of said packets based on said actual value of said traffic reservation parameter when said actual value of said traffic parameter exceeds said threshold value for said traffic reservation parameter.

According to another exemplary embodiment of the present invention, this object is achieved by a communications network element including a marking determination device.

Indeed, by holding a threshold value for a traffic reservation parameter, where the threshold value lies between the minimum and maximum value of the traffic reservation parameter, subsequently the actual value of the traffic reservation parameter is metered and if the actual value exceeds the threshold value for the traffic reservation parameter, which means that there is an amount of available network resources being dedicated to packets having a certain pre-assigned priority, but currently not being used, the determining of the packets marking of the packet is only based on the actual value of the traffic reservation parameter. This means that the pre-assigned priority is not taken into account for the determination of the marking. As a consequence the available resources, dedicated to high priority packets that however are not used, now can be dedicated to packets having a lower priority instead of the high priority packets. In this way, more available network resources are allocated to incoming packets, without leaving the network resources unused. As a consequence the efficiency of usage of network resources improves.

Another characteristic feature of the present invention is that determination packet marking additionally may be based on at least one additional pre-assigned priority for each said packet of said incoming packet-flow, each said additional pre-assigned priority having a separate threshold value assigned to said traffic reservation parameter.

In this way, by additionally determining a packet marking based on at least one additional pre-assigned priority for packets of the incoming packet-flow, each additional pre-assigned priority having a separate threshold value assigned to the traffic parameter it is possible to differentiate in the packet marking based on these pre-assigned priorities.

A further characteristic feature of the present invention is that said traffic reservation parameter may be the filling level of a token bucket.

A preferred embodiment of a traffic reservation parameter is the filling level of a token bucket.

Another characteristic feature of the present invention is that said traffic reservation parameter may be a sending rate estimate.

An embodiment of a traffic reservation parameter is the sending rate estimate.

Still further characteristic features of the present invention are that said pre-assigned priority and/or said additional pre-assigned priority may be a packet loss priority, a packet traffic category, or a type of sender.

Possible pre-assigned priorities are respectively the packet loss priority, a packet traffic category or a type of sender.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawing representing a marking device incorporated in a communications network element.

DETAILED DESCRIPTION OF EXEMPLARY EMBODIMENTS OF THE INVENTION

In the following paragraphs, referring to the drawing, an implementation of the method according to the present invention will be described. In the first part of this each of the main parts of the marking device is described. Secondly, all interconnections between this before mentioned parts are described and subsequently the actual execution of the marking method is described.

The marking device comprises a reception part RP that is adapted to receive packets of an incoming IP-packet stream. Further there is a marking part MAP that is able to mark each of the incoming packets of the incoming flow with a priority indicating the discard priority based on an instruction of the determination part DETP.

Further there are two token buckets TB1, TB2, being adapted to contain a number of tokens, respectively green tokens and yellow tokens, each representing an amount of network resources capacity for packets to be sent. Each of the buckets is filled with a number of respectively green or yellow tokens per time-unit. The filling level of the green bucket stands for a guaranteed amount of bandwidth packets for packets to be sent and the filling level of the bucket containing yellow tokens stands for an amount of excess bandwidth available for packets to be sent.

Additionally, there is a metering part MEP that is adapted to check on said actual filling level of each of both buckets. The marking device besides has a threshold holding part THHP, that is able to hold a threshold value TH1, TH2 for each of the filling level of each of the buckets. The threshold value is lying between the minimum and the maximum value of each of the bucket filling level. Then, the marking device comprises a determination part DETP, that is adapted to determine the packet marking of each packet to be sent out of the marking device.

The reception part RP has an input-terminal that is at the same time an input-terminal $I_1$ of the marking device and is further coupled to the marking part MAP that in its turn is coupled with an output-terminal to an output-terminal $O_1$ of marking device. The metering part MEP is coupled with a first input-terminal to an output-terminal of the first token bucket TB1, with a second input-terminal to an output-terminal of the other token bucket TB2 and with a third input-terminal to an output-terminal of the reception part RP. Additionally, the metering part MEP has an output-terminal coupled to an input-terminal of the determination part DETP. The determination part DETP has an output-terminal that is coupled to an input-terminal of the marking part MAP. Moreover, there is a threshold holding part THHP having an output-terminal that is coupled to an input-terminal of the determination part DETP.

In order to explain the execution of the present invention it is at first assumed that token bucket TB1 is being assigned a threshold value TH1 and token bucket TB2, a threshold value TH2. Moreover, it is assumed that each token bucket TB1 and token bucket TB2 are filled with respective rates rate of CIR and PIR tokens per time unit and that in the beginning each of the token buckets is filled up to the respective threshold values TH1 and TH2.

Further it is assumed that at the input of marking device $I_1$ a flow of IP-packets is fed. This flow consists of all pre-marked packets, each marked with either a green, yellow or red colour. The colour of each of the packets represents the discard priority, i.e. a low discard priority in case of a green colour, a medium discard priority in case of yellow and a high discard priority in case of the red packet. It is also assumed that the pre-marking is done in an upstream network element.

At a certain moment of time, the reception part receives an IP-packet from the flow and at the same time the metering part MEP, meters the levels of the token buckets. Each of the levels of tokens in the buckets is found to be beneath the respective threshold value TH1 and TH2. Hence, the determination part DETP considers the pre-assigned discard priority to be relevant in the determination of the marking of the packet. In case the incoming packet is marked red, the marking is not changed and the packet will leave the marking device still as a red packet. If the incoming packet is yellow coloured, the determination part DETP takes out a number of yellow tokens from the bucket TB2, corresponding to the length of the packet and instructs the marking part to leave the packet as it is. However, in case, the number of tokens corresponding to the length of the packet is higher than the available number of tokens in the bucket TB2, the determination part instructs the marking device to mark the yellow packet with a red colour because there is not sufficient capacity available to send the yellow packet. In case the incoming packet has a green colour, the determination part DETP subtracts corresponding to the length of the packet a number of green and the same number of yellow tokens out of each of the buckets TB1 and TB2 and subsequently instructs the marking part MAP to forward the packet as a green packet. However, in case there are not enough green tokens, indicating that there is not enough capacity reserved, the packet is marked yellow if there are enough yellow tokens, and red otherwise.

The algorithm of marking as previously described is in conformance with the marking algorithm described in Engineering Task Force (IETF) document "*A Two rate three colour marker*" with reference RFC 2698, more specific in paragraph 3 wherein the algorithm is referred to as the colour aware marking mode.

Additionally it is assumed that the upstream packet-flow contains mostly red and yellow marked packets meaning that almost no green token and less yellow tokens are consumed, leaving available bandwidth for green packets unused. Hence, it is assumed that the actual filling level of each of the token buckets rises above the threshold value. The metering part detects this rise of the actual filling level over the respective threshold values and in order to make use of the reserved bandwidth does not consider the colour of the incoming packets anymore.

In case the incoming packet is marked red, the determination part takes out a number of yellow tokens from the bucket TB2, corresponding to the length of the packet and instructs the marking part to mark the packet yellow if only the filling level of token bucket TB2 is above the threshold. If both the filling level of token bucket TB2 and token bucket TB1 are above the threshold, the determination part takes out a number of yellow tokens from the bucket TB2 and the same number of green tokens from token bucket TB1 (not shown in drawing), this number of tokens being in correspondence with the length of the packet and instructs the marking part to mark the packet green, i.e. with the lowest cell loss priority, and subsequently forward the packet.

If the incoming packet is yellow coloured, and if the filling level of token bucket TB1 is above the threshold, the determination part takes out a number of green tokens from token bucket TB1 (not shown in drawing), this number of tokens being in correspondence with the length of the packet and instructs the marking part to mark the packet green, i.e. with the lowest cell loss priority, and subsequently forward the packet.

The algorithm of marking as previously described is in conformance with the marking algorithm referred to as the colour blind mode described in paragraph 3 of the previously mentioned Engineering Task Force (IETF) document "*A Two rate three colour marker*" with reference RFC 2698.

It is to be noticed that the that instead of IP-packets any other packet such as ATM packets or frame-relay packets are applicable.

It is also to be noticed that instead of one pre-assigned priority i.e. the cell loss priority, one or more additional priorities per traffic reservation parameter, i.e. the filling level of token bucket TB1 or TB2, is applicable.

It is additionally to be remarked that instead of the filling level of the token buckets also a sending rate estimate as used in the Time sliding window Three colour marker as described in Engineering Task Force (IETF) document with reference RFC 2859, can be used.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

The invention claimed is:

1. A marking determining method, for determining a packet marking of packets of an incoming packet-flow, in order to keep said packets in conformance with a traffic policy,
   said determining being based on an actual value of a traffic reservation parameter, said traffic reservation parameter being a measure of available network resources dedicated to packets of said incoming packet-flow having a pre-assigned priority,
   said determining further being based on said pre-assigned priority of said packets of said incoming packet flow, said traffic reservation parameter having a predetermined minimum and a maximum value,
   said marking determining method comprising:
      holding a threshold value for said traffic reservation parameter, said threshold value lying between said minimum and said maximum value of said traffic reservation parameter;
      metering said actual value of said traffic reservation parameter; and
      if said actual value of said traffic reservation parameter exceeds said threshold value for said traffic reservation parameter, determining said packet marking of and marking each of said packets based on said actual value of said traffic reservation parameter, and if said actual value of said traffic reservation parameter is below said threshold value for said traffic reservation parameter, determining said packet marking of and marking each of said packets based on a pre-assigned priority of the packet.

2. The marking determining method according to claim 1, wherein said determination of packet marking additionally is based on at least one additional pre-assigned priority for each said packet of said incoming packet-flow, each said additional pre-assigned priority having a separate threshold value assigned to said traffic reservation parameter.

3. The marking determining method according to claim 1, wherein said traffic reservation parameter is the filling level of a token bucket.

4. The marking determining method according to claim 1, wherein said traffic reservation parameter is a sending rate estimate.

5. The marking determining method according to claim 1, wherein said pre-assigned priority and/or said additional pre-assigned priority is a packet loss priority.

6. The marking determining method according to claim 1, wherein said pre-assigned priority and/or said additional pre-assigned priority is a packet traffic category.

7. The marking determining method according to claim 1, wherein said pre-assigned priority and/or said additional pre-assigned priority is a type of sender.

8. The marking determining device, for determining a packet marking of packets of an incoming packet-flow, in order to keep said packets in conformance with a traffic policy,
   said determining being based on an actual value of a traffic reservation parameter, said traffic reservation parameter being a measure of available network resources dedicated to packets of said incoming packet-flow having a pre-assigned priority,
   said determining further being based on said pre-assigned priority of said packets of said incoming packet flow, said traffic reservation parameter having a predetermined minimum and a maximum value, said marking determining device comprising:
- a threshold holding part (THHP), adapted to hold a threshold value for said traffic reservation parameter, said threshold value lying between said minimum and said maximum value of said traffic reservation parameter;
- a metering part (MEP), adapted to check on said actual value of said traffic reservation parameter; and
- a determination part (DETP), adapted to, if said actual value of said traffic reservation parameter exceeds said threshold value for the traffic reservation parameter, determine said packet marking of and mark each of said packets based on said actual value of said traffic reservation parameter, and if said actual value of said traffic reservation parameter is below said threshold value for said traffic reservation parameter, determine said packet marking of and mark each of said packets based on a pre-assigned priority of the packet.

9. The marking determining device according to claim 8, wherein said determination packet marking additionally is based on at least one additional pre-assigned priority for each said packet of said incoming packet-flow, each said additional pre-assigned priority having a separate threshold value assigned to each of said traffic reservation parameter.

10. The marking determining device according to claim 8, wherein said traffic reservation parameter is a filling level of a token bucket.

11. The marking determining device according to claim 8, wherein said traffic reservation parameter is a sending rate estimate.

12. The marking determining device according to claim 8, wherein said pre-assigned priority and/or said additional pre-assigned priority is a packet loss priority.

13. The marking determining device according to claim 8, wherein said pre-assigned priority and/or said additional pre-assigned priority is a packet traffic category.

14. The marking determining device according to claim 8, wherein said pre-assigned priority and/or said additional pre-assigned priority is a type of sender.

15. A communication network element including the marking determination device as claimed in claim 8.

16. A marking determining method for determining a packet marking of packets of an incoming packet-flow in order to keep said packets in conformance with a traffic policy, the marking determining method comprising:
- providing a threshold value for a traffic reservation parameter, said threshold value lying between a minimum value and a maximum value of the traffic reservation parameter;
- metering an actual value of the traffic reservation parameter; and
- if the actual value of the traffic reservation parameter exceeds the threshold value of the traffic reservation parameter, marking the packets only based on the actual value of the traffic reservation parameter, and
- if the actual value of the traffic reservation parameter is below the threshold value of the traffic reservation parameter, marking the packets based on a pre-assigned priority of the packet.

* * * * *